Nov. 19, 1935. F. E. STAHL 2,021,157
METHOD OF WELDING
Filed June 23, 1933
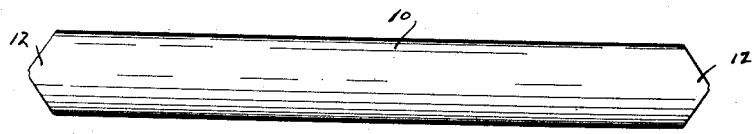
Fig. 1.
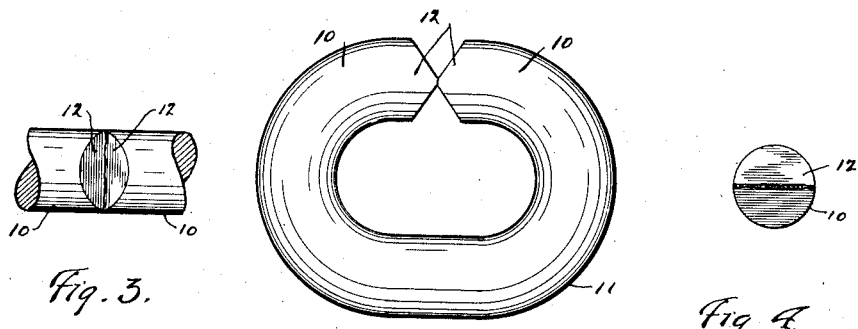
Fig. 3. Fig. 2. Fig. 4.
 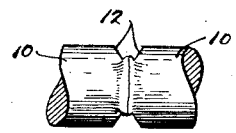
Fig. 5. Fig. 6.
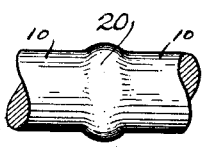
Fig. 7.
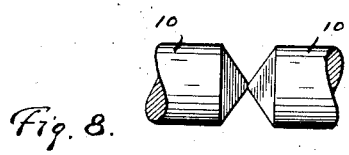 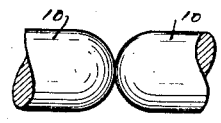
Fig. 8. Fig. 9.
INVENTOR
FRANK E. STAHL
BY
ATTORNEY Patented Nov. 19, 1935

2,021,157

UNITED STATES PATENT OFFICE 2,021,157

METHOD OF WELDING

Frank E. Stahl, Tonawanda, N. Y., assignor to Columbus McKinnon Chain Corporation, Tonawanda, N. Y., a corporation of New York Application June 23, 1933, Serial No. 677,300

3 Claims. (Cl. 219—10)

My invention relates in general to an improved method of welding, and, in particular, to the welding of the ends of wires or rods by electricity.

It is well known to those skilled in the art that in the electric butt welding of wire or rods, particularly of the larger sizes, where the abutting ends at the joint are substantially in parallel relationship, gas pockets are formed in the welded surfaces or foreign matter is entrapped therein, with the result that oxidation occurs, thus weakening the weld. Moreover, in such joints, the portions which first contact are many times heated above the desired temperature before the rest of the surface becomes heated, with the result that the metal is likely to become burned. Particularly is this so in the welding of high carbon or certain alloy steels, especially those containing nickel, where there is a very limited tolerance as to the welding temperature. In such cases the temperature must be kept within very narrow limits in order to produce a perfect weld.

The principal object of my invention has been to provide a method which will overcome the above disadvantages and one by which the temperature of the weld may be so controlled that high carbon or alloy steels may be used in, for instance, the manufacture of chains, thus greatly increasing the strength of the chain for a given size.

Another object has been to provide a method whereby the welding will start at a central area in the abutting surfaces and work outwardly toward the perimeter thereof.

My invention is particularly applicable to the welding of chain links, and as an illustration thereof, I have shown in the accompanying drawing a chain link and a blank for making the same. In the drawing:

Fig. 1 is a side elevation of a blank.

Fig. 2 is a side elevation of a link formed from the blank and ready to be welded.

Fig. 3 is a fragmentary top view of the abutting ends before being welded.

Fig. 4 is an end view of one of the ends of the blank.

Fig. 5 is a fragmentary, side elevation of the joint partly welded.

Fig. 6 is a similar view of the joint showing the welding further advanced.

Fig. 7 is a similar view showing the weld completed.

Figs. 8 and 9 show fragmentary views of two modified forms of joints.

In the following specification and the appended claims, when I use the terms high carbon and alloy steels, I mean steels having a carbon content of from .07 to .20% and containing nickel, molybdenum, chrome, or manganese in suitable combination, as, for example, molybdenum nickel, manganese chrome, or chrome nickel. All of the advantages, however, in my method will be found in the use of other alloy combinations or the use of substitute alloy ingredients.

My method is applicable to the welding of wire or rods of various shapes, and for illustrative purposes, I have shown in the drawing a blank 10 which is used in the formation of a link 11. Since, in my method, the welding of the metal starts first at a central area of the ends to be united and progresses outwardly to the outer periphery of the stock, each of the ends of the blank is formed with a tip 12 of such shape that the cross-sectional area of each tip gradually increases from the extremity thereof to the full body area of the stock. The extremity of each tip is so arranged that it lies in a plane which is substantially coincident with the central axis of the ends of the blank. With the provision of such ends, considerable movement must be provided for during the welding operation, for the reason that the gaps between the adjacent inclined surfaces must be closed up and the full size stock brought together in the completed weld. Since the welding operation must not be interrupted during this entire movement; and, since it is necessary that pressure be maintained throughout the period of welding if the weld is to be satisfactory, it is obvious that there must be a follow-up movement of the ends which is substantially proportionate to the heating and softening thereof during welding. In Figs. 1 to 6, inclusive, I have shown such tip as of substantially V-shaped cross-section. The arrangement of the V-shaped tips is such that when the blank is formed into a link, as shown in Fig. 2, the edges of the tips will lie in substantially the same plane and in juxtaposition.

When welding the ends of the blank 10 after being formed in the link 11, the tips are brought into contact with each other and an electric current is made to pass through the joint, in any well known manner. Substantially at the same time that the electric current is applied to the tips, a definite initial pressure is exerted upon the link whereby the tips are brought in contact. The relatively small area of metal abutting at the first contact of the tips instantly reaches welding heat and these surfaces are substantially flash welded. After the initial heating, the flow of electricity is maintained and the heat continues to travel back uniformly from each side of the weld at the tips at welding temperature and as it does so, the ends of the link are moved toward each other and forced together proportionately to the travel of the heat so that substantially the same degree of pressure is maintained upon the welded joint throughout the process of welding. As the heating continues and the pressure is maintained by the movement of the continuously closing joint, the welded area will increase and spread substantially uniformly from a central or axial plane outwardly toward the perimeters of the ends of the blank, as clearly shown by Figs. 5 and 6. The flow of electric current is maintained, and the pressure is also maintained by the follow-up movement of the tips as they are merging together in the process of welding, until the welding surface reaches an area substantially equal to the area of the stock and until they have been forced together sufficient so as to completely weld the joint over the entire area. When welding a joint having chisel-shaped ends, the metal in the joint at the sides of the link, being in initial contact, will be extruded beyond the side surfaces of the link stock from the beginning of the weld; and such extrusion will continue to occur at opposite sides of the joint being welded until the ends have been forced together by means of the follow-up pressure far enough to close the gaps in the joint, or until the welded surface has reached the outside diameter of the stock at the top and bottom of the link. Any further movement of the ends will produce some extrusion at the top and bottom also. A swell is thus preferably formed all around the welded joint, as shown in Fig. 7.

Some initial pressure is, as above stated, exerted upon the ends of the joints to be welded so as to prevent the metal spluttering out and to maintain electric contact between the tips when the current is first applied. However, in my new process, this initial application of pressure is, in itself, wholly unsuitable for completing my process, since, as above pointed out, the movement of the ends must be such that a definite pressure will be maintained upon the abutting tips so that the gaps between the tips will be closed up and thus compensate for the shortening thereof during the process of welding. If the pressure were applied only at the beginning of the weld, as in the well known process of butt welding joints having substantially parallel faces, this pressure would be substantially released during the first part of my new method due to the fact that the metal in the tips has become soft and molten under the influence of the welding heat and, unless this condition is compensated for by proportionate movement of the ends of the blank toward each other, and the pressure is maintained substantially constant, the molten metal will fall away from the contacting areas and out from between the adjacent ends of the link, thus making it impossible to complete the weld. In carrying out my method it is, therefore, necessary that a definite and sufficient pressure be applied at the beginning when the current is first made to pass through the reduced area at the joint and that this pressure be maintained throughout the welding operation by a movement of the ends toward each other as the area of the weld is continuously increasing. After the ends have been forced together and the weld completed, as shown in Fig. 7, the flow of electricity is interrupted. The current is then allowed to pass through the welded joint interruptedly at short durations in order to maintain the heat at the joint at proper temperature for forging in the subsequent reforming of the swell, which is not a part of this invention, and is, therefore, not shown or described in detail. After the weld is completed, pressure is maintained thereon until the weld in the joint has completely set.

In Fig. 8, I show joints of pyramidal form, and they may be made cone-shaped also, if desired. In Fig. 9 the ends of the joints are made semispherical. It is obvious that any form of joint may be used so long as the ends are similarly formed and there is a reduced area at the center which will gradually increase as the weld progresses until the full area of the stock has been reached.

From the foregoing it will be clear that my method is one which may be very easily carried out, particularly in the use of high carbon or alloy steels, and one which produces a perfect weld, even when used on stock of the larger sizes.

Having thus described my invention, what I claim is:

1. A method of welding a chain link comprising the formation of a link blank having a tip on each of its ends, each of such tips having an abutting surface lying in a plane substantially coincident with the central axis of the blank, each of such tips having a cross-sectional area gradually increasing from the extremity thereof to the full body area of the stock, bringing the abutting surfaces of the tips in contact with each other, applying pressure to the tips to force them together, simultaneously applying an electric current across the centrally disposed, abutting surfaces, whereby such abutting surfaces will be instantaneously welded, continuing the application of current, maintaining the pressure by progressively advancing the ends toward each other an amount which is substantially in direct proportion to the melting of the metal in the tips, whereby the welding is continued in opposite directions from the central area outwardly toward the perimeter of the blank until the joint has reached the desired welded area.

2. A method of welding a chain link comprising the formation of a link blank having a tip on each of its ends, each of such tips having an abutting surface lying in a plane substantially coincident with the central axis of the blank, each of such tips having a cross-sectional area gradually increasing from the extremity thereof to the full body area of the stock, bringing the abutting surfaces of the tips in contact with each other, initially applying a predetermined pressure to the tips to force them together, simultaneously applying an electric current across the centrally disposed, abutting surfaces, whereby a flash weld occurs across such surfaces, continuing the passage of current through the joint, and substantially maintaining such predetermined pressure upon the joint of the link until the weld is completed.

3. A method of welding a chain link, comprising the formation of a link blank having a tip on each of its ends, each of such tips being formed with a substantially diametrically arranged chisel-shaped edge having an abutting surface at its extremity, bringing the tips in juxtaposition and in contact with each other, initially applying a predetermined pressure to the tips to force them together, simultaneously applying an electric current across the centrally disposed, abutting surfaces, whereby a flash weld occurs across such surfaces, continuing the passage of current through the joint, and substantially maintaining such predetermined pressure upon the joint of the link until the weld is completed.

FRANK E. STAHL.